United States Patent [19]

Bernard

[11] Patent Number: 5,264,532
[45] Date of Patent: Nov. 23, 1993

[54] EMULSION PRESSURE-SENSITIVE ADHESIVES

[75] Inventor: Margaret M. Bernard, La Verne, Calif.

[73] Assignee: Avery Dennison Corporation, Pasadena, Calif.

[21] Appl. No.: 955,467

[22] Filed: Oct. 2, 1992

Related U.S. Application Data

[63] Continuation-in-part of Ser. No. 848,092, Mar. 19, 1992, Pat. No. 5,189,126, which is a continuation-in-part of Ser. No. 567,141, Aug. 14, 1990, Pat. No. 5,164,444, which is a continuation-in-part of Ser. No. 393,970, Aug. 14, 1989, abandoned.

[51] Int. Cl.$^5$ ............................................. C08F 26/06
[52] U.S. Cl. ................................... 526/261; 526/274; 526/278
[58] Field of Search ..................... 526/261, 274, 278

[56] References Cited

U.S. PATENT DOCUMENTS

| | | | |
|---|---|---|---|
| 3,770,679 | 11/1973 | Corey et al. | 526/318.43 |
| 3,925,288 | 12/1975 | Gunshaw et al. | 526/318.43 |
| 4,056,503 | 11/1977 | Powanda et al. | 524/833 |
| 4,113,540 | 9/1978 | Patella et al. | 524/833 |
| 4,143,017 | 3/1979 | Tarumi et al. | 526/318.43 |
| 4,212,785 | 7/1980 | Türck | 526/318.43 |
| 4,222,780 | 9/1983 | Shibatami et al. | 526/278 |
| 4,364,043 | 1/1983 | Yamauchi et al. | 526/278 |
| 4,420,597 | 12/1983 | Gruber | 526/261 |
| 4,507,429 | 3/1985 | Lenney | 526/210 |
| 4,537,940 | 8/1985 | Omura et al. | 526/278 |
| 4,564,664 | 1/1986 | Chang et al. | 524/833 |
| 4,587,313 | 5/1986 | Ohta et al. | 526/278 |
| 4,619,964 | 12/1986 | Kielbania et al. | 524/833 |
| 4,694,056 | 9/1987 | Lenney | 526/210 |
| 4,725,639 | 2/1988 | Lenney | 525/301 |
| 4,739,004 | 4/1988 | Sekmakas et al. | 524/833 |
| 4,812,547 | 3/1989 | Mudge | 526/318.43 |
| 4,826,938 | 5/1989 | Mudge | 526/261 |
| 4,908,403 | 3/1990 | Spada et al. | 524/818 |
| 4,983,656 | 1/1991 | Ito et al. | 524/833 |
| 5,011,867 | 4/1991 | Mallya et al. | 524/833 |
| 5,041,495 | 8/1991 | Schwerzel et al. | 524/833 |

FOREIGN PATENT DOCUMENTS

| | | | |
|---|---|---|---|
| 0147067 | 7/1985 | European Pat. Off. | 524/833 |
| 0212358 | 3/1987 | European Pat. Off. | 524/833 |
| 0146604 | 2/1981 | German Democratic Rep. | 524/833 |
| 2070057 | 9/1981 | United Kingdom | 524/833 |

Primary Examiner—Joseph L. Schofer
Assistant Examiner—N. Sarofin
Attorney, Agent, or Firm—Christie, Parker & Hale

[57] ABSTRACT

Inherently tacky pressure-sensitive acrylic polymers are formed by emulsion polymerization in the presence of at least one reactive multifunctional monomer having a cyanurate or phosphate functionality.

10 Claims, No Drawings

EMULSION PRESSURE-SENSITIVE ADHESIVES

CROSS-REFERENCE TO RELATED APPLICATIONS

This is a Continuation-in-Part of application Ser. No. 07/848,092 filed Mar. 9, 1992, U.S. Pat. No. 5,189,126 which is a Continuation-in-Part of application Ser. No. 07/567,141, U.S. Pat. No. 5,164,444 filed Aug. 14, 1990 which is a Continuation-in-Part of application Ser. No. 07/393,970, which is now abandoned, filed Aug. 14, 1989 now abandoned, each incorporated herein by reference.

BACKGROUND OF THE INVENTION

The present invention relates to acrylic polymers which are formed by emulsion polymerization and as formed, are inherently tacky and functional as pressure-sensitive adhesives. More particularly, the adhesives of the instant invention have excellent guillotinability, room- and elevated-temperature adhesive performance and provide an ecologically safe replacement for solvent adhesives and other acrylic- and rubber-based emulsion adhesives.

Guillotinability is a critical requirement in film applications where pressure-sensitive adhesive (PSA) coated products are cut into sheet stock. During the process of guillotining it is expected that the adhesive will not build on the blades so that subsequent cutting is not affected and the cut sheets separate individually without sticking together. Solvent adhesives are commonly used in such applications due to the performance benefits they offer. Environmental constraints imposed on the use of solvents has caused the PSA industry to move away from solvent systems. The best alternative to day is the water borne adhesive technology due to adhesive user friendliness and the cost advantages. Obtaining high performance from water borne adhesive systems is the major task which the PSA industry is facing.

In terms of the instant invention U.S. Pat. Nos. 4,507,429, 4,694,056, and 4,725,639 to Lenney, and assigned to Air Products, Inc., pertain to a pressure-sensitive adhesive compositions and disclose increasing cohesive strength by use of polyfunctional monomers which include polyvinyl and polyallyl compounds including triallyl isocyanurate. Product glass transition temperature may be as high as −15° C., limiting utility at reduced temperature.

We have sought to provide pressure-sensitive adhesives of improved properties which have broad utility including excellent guillotinability.

SUMMARY OF THE INVENTION

According to the present invention, there is provided inherently tacky acrylic emulsion adhesive polymers which exhibit excellent guillotinability and have excellent adhesion to a wide variety of surfaces ranging from polar, relatively high energy surfaces such as stainless steel to nonpolar, relatively low energy surfaces such as polyethylene and to difficult-to-bond surfaces such as corrugated board. Moreover, cohesion and adhesion at room and elevated temperatures is excellent and, when part of a laminate stock such as pressure-sensitive adhesive label stock, provides excellent high-speed converting characteristics such as die cutting, matrix stripping and fan folding. Superior properties are obtained even at lower-than-normal coat weights. In sum, the adhesive polymers are broad-based and serve to replace many solvent-based adhesives on an ecologically safe basis as well as many emulsion-based adhesives, thus serving a variety of markets.

The inherently tacky, emulsion pressure-sensitive adhesive polymers of the instant invention comprise, on a polymerized basis and based on the total weight of the polymer of at least one soft monomer having a glass transition of less than −25° C. Preferably the soft monomer is an alkyl acrylate containing from about 4 to about 12 carbon atoms in the alkyl group, most preferably a mixture of 2-ethylhexyl acrylate and butyl acrylate. The total of the soft monomers are present in an amount of from about 35 to about 95 percent by weight of the polymer.

The polymer contains at least one hard monomer having a glass transition temperature greater than 0° C. and preferably further includes a soft diester monomer such as maleates and fumarates.

The emulsion polymers of this invention are formed in the presence about 0.1 to about 1 percent of a multifunctional monomer having a cyanurate or phosphate functionality with tris(2-hydroxyethyl) isocyanurate triacrylate and bis(methacryloxyethyl) phosphate presently preferred. The emulsion polymers of the invention are high performance polymers preferably having a gel content in excess of about 60 percent by weight of the polymer.

The emulsion adhesive polymers of the instant invention are preferably prepared using a reactive surfactant which polymerizes and becomes part of the emulsion polymer and which has been observed to enhance cohesive strength and aid in copolymerization of the monomers in forming the emulsion pressure-sensitive adhesive polymers of the instant invention. The amount of reactive surfactant employed in the preparation of the emulsion pressure-sensitive adhesives of the present invention is a positive amount up to about 0.4 percent by weight of the total monomers, preferably from about 0.1 to about 0.25 percent by weight. The preferred reactive surfactants are anionic vinyl functional surfactants, such as sodium vinyl sulfonate and sodium styrene sulfonate.

The emulsion adhesives of the instant invention may be prepared with excellent conversions at reaction temperatures ranging from 70° to about 85° C. in the presence of from about 0.5 to about 1 percent by weight, based on the weight of the monomers, of a persulfate or equivalent catalyst, with the monomer mix being fed over a period of about 4 to about 5 hours. Reaction pH is from about 2.5 to about 7.0. Conversion is high, approaching 100 percent at the reaction conditions set forth above.

The use of the multifunctional monomers of this invention having cyanurate or phosphate moieties give a significant improvement in cohesive strength without much loss of peel and tack. The multifunctional monomers may be used with or without a chain transfer agent, and cross-linking agents, e.g. metal salts such as aluminum acetate. It has been found that copolymerizing multifunctional acrylate monomers without said moieties are not effective in improving guillotinability and elevated temperature performance.

The present invention provides low cost water borne pressure-sensitive adhesives which exhibit high guillotinability and excellent adhesive performance at room temperature and after elevated temperature aging. The multifunctional monomers used in this invention provide hydrogen bonding with functional groups such as carboxy groups and enhance adhesion to polar substrates without affecting peel and tack. Shear performance is further enhanced by metal cross-linking. This creates a highly cohesive net work which enhances guillotine performance.

DETAILED DESCRIPTION

The present invention relates to pressure-sensitive adhesive compositions based on emulsion polymers which provide excellent processability including guillotinability and high adhesion and high tack to polar, nonpolar and difficult-to-bond substrates with excellent cohesion. The adhesives have properties sufficient to make them useful for replacing solvent polymers, tackified styrene-butadiene emulsion pressure-sensitive adhesives, and nontackified and tackified acrylic pressure-sensitive adhesives. An improvement exhibited over tackified styrene-butadiene resin adhesives include better aging and no edge ooze or bleed as part of a release liner adhesive face stock laminate. In addition, being functional as a single polymer, there is a minimal or no need for compounding and tackification. The improved performance characteristics of the adhesive of the instant invention enable them to be used on almost any available face stock. Properties induced in the adhesive by proper selection of monomers and surfactants give excellent moisture resistance.

As compared to prior art acrylic pressure-sensitive adhesives which do not give good adhesion to nonpolar surfaces, such as polyolefins and certain other surfaces such as recycled corrugated board, without tackification with attendant sacrifice in cohesive strength and elevated-temperature performance, the adhesives prepared in accordance with the instant invention have excellent adhesion to both polyolefins and corrugated board and good elevated-temperature performance. The adhesives are more universal in their use, a result not heretofore achieved in single polymer adhesives.

The emulsion based pressure-sensitive adhesives of the instant invention contain, on a percent by weight basis from about 35 to about 95 percent by weight total monomers of at least one soft monomer preferably an alkyl acrylate or vinate containing about 4 to about 12 carbon atoms in the alkyl group and which have a glass transition temperature (Tg) of less than $-25°$ C. Preferably, a mixture of alkyl acrylates are employed with the total alkyl acrylate concentration, in an amount of from about 35 to 60 more preferably 40 to about 50 percent by weight of the monomers. Useful alkyl acrylates include n-butyl acrylate, 2-ethylhexyl acrylate, isooctyl acrylate and the like, with a mixture 2-ethylhexyl acrylate and butyl acrylate being preferred. These are "soft monomers" because of low glass transition temperature. Other soft monomers of the instant invention are one or more diesters of a dicarboxylic acid and mixtures thereof, present in a total amount of from about 0 to about 30 percent by weight based on the total weight of the monomers preferably from 5 to about 30 percent by weight of the monomers. Each ester group of the diester of the dicarboxylic acid independently contains from about 4 to about 12, preferably from about 8 to about 12 carbon atoms. The preferred diesters are di-2-ethylhexyl maleate, di-2-ethylhexyl fumarate and mixtures thereof. The diester monomers improve tack and overall adhesive properties.

The balance of the monomers are "hard monomers" having a Tg greater than about $0°$ C. They include vinyl esters, carboxylic acids and methacrylates.

Vinyl esters may be present in a total amount of from about 0 to about 35 percent by weight, preferably from about 20 to about 25 percent by weight based on total weight of the monomers, said vinyl esters containing from 2 to about 16 carbon atoms in the alkyl group of the ester. Representative of the vinyl esters include vinyl acetate, vinyl butyrate, vinyl propionate, vinyl isobutyrate, vinyl valerate, vinyl versitate, and the like. Vinyl acetate is preferred. The vinyl esters aid in the copolymerization of maleate and fumarate monomers and enhance cohesive strength and peel adhesion.

The inclusion of one or more unsaturated carboxylic acids containing from about 3 to about 5 carbon atoms enhances cohesive strength, adhesion to polar surfaces and stabilizes the particles formed during emulsion polymerization. The unsaturated carboxylic acids are provided in a positive amount of up to about 10 percent by weight of the polymer, preferably from 1 to about 5 percent by weight. The unsaturated carboxylic acids include, among others, acrylic acid, methacrylic acid, itaconic acid, and the like. Acrylic acid, methacrylic acid, and more preferably mixtures thereof, are presently preferred.

Cohesive strength may be enhanced by inclusion of an alkyl methacrylate containing from 1 to about 8 carbon atoms in the alkyl group and present in an amount of from 0 to 10 percent by weight of the monomers. Methyl methacrylate is presently preferred.

The emulsion adhesives of the instant invention are preferably prepared in the presence of a reactive surfactant which polymerizes during formation of the polymer and becomes an integral part of the polymer. Preferred reactive surfactants include anionic vinyl functional monomers such as sodium vinyl sulfonate and sodium styrene sulfonate and the like. The reactive surfactant is present as part of the total surfactant system and in an amount up to about 0.4 percent by weight of the total monomers, preferably about 0.1 to about 0.25 percent by weight.

An essential component of the instant invention is a reactive multifunctional monomer which is an acrylate and/or methacrylate having a cyanurate or phosphate moiety and present in an amount of from 0.1 to about 1 percent by weight of the monomers. The multifunctional monomers improve guillotinability without adversely affecting adhesive properties. The presently preferred multi-functional monomers are tris-(2-hydroxyethyl)isocyanurate triacrylate and bis-(methacryloxyethyl) phosphate.

Presently preferred emulsion polymers contain, exclusive of reactive monomers, about 25 to 35 percent by weight 2-ethylhexyl acrylate, about 15 to 25 percent by weight butyl acrylate, about 20 to 25 percent by weight vinyl acetate, about 15 to 25 percent by weight di-2-ethylhexyl maleate (dioctyl maleate), about 0.5 percent by weight tris-(2-hydroxyethyl) isocyanurate triacrylate, about 2 percent by weight acrylic acid, and about 2 percent by weight methacrylic acid.

The monomer proportions are normally adjusted in such a way that the adhesive has a glass transition temperature less than about $-20°$ C., giving a good balance of adhesion and tack at room temperature and elevated temperatures. The emulsion polymers of this invention have a very broad glass transition temperature range of from $15°$ to $30°$ C., which is unusual among acrylic polymers. Conventional acrylic polymers, for instance, have a glass transition temperature range of only 10 to 15° C. Depending on polymerization conditions, copolymers showing two distinct glass transition temperatures, have been observed.

The preferred gel content or percent insolubles are in excess of 60 percent by weight which provides excellent cohesive strength and high performance. In this regard, gel represents the amount of polymer which is insoluble in tetrahydrofuran expressed in percent by weight and determined by the membrane gel partitioning method. In this method, about 600 to 800 milligrams of 100 percent solid polymer is weighed onto a millipore membrane disk of 5 micrometer porosity. The disk is heat sealed and transferred to a scintillation vial. About 20 milliliters of tetrahydrofuran is added to the vial and the vial is rotated on a shaker for 16 to 24 hours. The sealed disk is then removed, washed with tetrahydrofuran, and dried first by placing it on a Whatman No. 1 filter paper, followed by exposure to 100° C. in the oven for a few hours. The dried disk is weighed and the insoluble portion of the polymer determined by the equation:

$$\text{Percent insoluble} = \frac{(b - c) \times 100}{a} = \% \text{ gel}$$

wherein
  a = total weight of 100 percent solids polymer
  b = the weight of the polymer plus membrane before tetrahydrofuran treatment
  c = polymer plus membrane remaining after tetrahydrofuran treatment.

Other aids which may be used to develop cross-linking include thermal cross-linking and cross-linking by actinic and electron beam radiation.

The polymers of the instant invention are prepared by emulsion polymerization under conditions of agitation in an autogenous atmosphere in the presence of suitable polymerization initiators such as peroxydisulfate and peroxides. Depending on desired polymer properties including gel content, the preferred levels of these initiators are in the range of from about 0.5 to about 1.0 percent by weight based on the total weight of the monomers. The presently preferred initiators are potassium persulfate, t-butyl hydrogen peroxide, and the like. Level of agitation will vary depending on the system and will influence conversion. Typically, about 30 to 50 percent of the total initiator is added along with an initial monomer charge to the reactor, and the rest is added along with the balance monomers during polymerization over a period of from about 4 to about 5 hours For the polymer to be free from coagulum and to maintain grit levels less than 20 ppm, it is desirable to maintain the pH of the emulsion during polymerization between from about 2 to about 4, preferably from about 2.5 to about 4. This can be achieved by the use of buffers such as sodium bicarbonate and sodium acetate, typically in amounts up to 0.3 percent by weight based on the weight of the monomer.

The stabilizer system used during polymerization contains a combination of anionic and nonionic surfactants present in an amount up to about 3.5 percent by weight based on the weight of the monomers. A suitable anionic surfactant is the sodium salt of an ethoxylated nonylphenol sulfate, and a suitable nonionic surfactant is ethoxylated nonylphenol. The best balance of properties is achieved by maintaining the anionic to nonionic surfactant ratio approximately 3 to 1.

Polymers of the instant invention are produced at high solids level content, typically about 50 to about 70 percent by weight. Reaction is carried out at temperatures from 70 to 85° C. with an initial charge of up to about 10 percent by weight of the total monomers, with the balance of the monomers being added to the emulsion reaction system over a period of about 4 to about 5 hours, with total monomer conversion approaching 100 percent.

It is possible to modify the rheology of the polymer for coating purposes by use of conventional thickeners such as SCT-270 manufactured and sold by Union Carbide and present in an amount up to 0.2 percent by weight. Although not required, it is also feasible to modify the properties by the use of tackifiers and the like. For general purpose applications, it is desirable to have good adhesion to both hydrophobic substrates such as polyethylene and hydrophilic substrates such as stainless steel and difficult-to-bond recycled corrugated board. Prior art acrylic polymers do not have good adhesion to such substrates unless they are modified by addition of a tackifier. This is not required using the pressure-sensitive adhesive polymer of this invention although tackifiers can be effectively used to tailor adhesion to a substrate.

In accordance with the present invention, there is also provided emulsion pressure-sensitive adhesive polymers with high shear performance even at elevated temperature with little or no detriment in peel and tack adhesion which can be used to replace high cost solvent acrylic polymers used in film applications. The di-2 ethylhexyl maleate in the composition provides tackiness to the adhesive and allows the use of vinyl acetate which provides good peel adhesion without the use of high levels of acid monomer which tends to reduce tack.

The presence of the multifunctional monomer in the copolymer itself provides some improvement in shear performance which may not be sufficient for high performance film applications. Further cross-linking by complex formation with metal salts dramatically enhances the shear in excess of 10,000 min. Elevated temperature (70° C.) shear is also greatly improved, with performance of the emulsion polymers being equivalent to solvent acrylic polymers. Adding multifunctional monomers to the copolymer may alter the gel content and/or glass transition temperature of the adhesive. Accordingly, when multifunctional monomers are used, they are added in an amount that yields an adhesive that is pressure-sensitive, i.e., the glass transition temperature is sufficiently low as to enable use as a PSA.

To maintain good balance of peel and tack with high shear it may be desirable to lower the molecular weight of the polymer by the use of chain transfer agents such as n-dodecyl mercaptan(n-DDM) and to use higher levels of initiator than what is commonly used. An optimum level of n-DDM in this invention is up to about 0.025 percent by weight of the monomers, preferably about 0.005 to about 0.01 percent by weight, and to employ a level of initiator of about 0.6 to about 0.75 percent by weight based on the weight of the monomer composition. Amounts exceeding these levels can result in cohesive failure in peel adhesion on certain substrates which will be detrimental to the product application. Aluminum acetate, if present, is normally present in an amount up to about 0.25 percent by weight of the monomers.

EXAMPLES 1 TO 4 AND CONTROLS 1 and 2 of 5.5-6.5 and discharged. The polymer had 58.9 percent solids, and a Tg of $-32°$ C.

Using the above procedure with n-DDM being omitted the polymers listed in Table 1 were prepared.

TABLE 1

| Example | Monomer Composition | Weight Ratio % | % Solids |
|---|---|---|---|
| Ex. 2 | 2-EHA/DOM/VAc/BA/HEITA/AA/MAA | 30/25/21/20/0.45/2/2 | 58.6 |
| Ex. 3 | " | 30/25/21/20/0.60/2/2 | 58.5 |
| Ex. 4 | " | 30/25/21/20/0.80/2/2 | 58.4 |
| Ex. 5 | 2-EHA/DOM/VAc/BA/HEITA/AA/MAA | 25/25/21/25/0.45/2/2 | 58.6 |
| Ex. 6 | " | 25/25/21/25/0.60/2/2 | 58.6 |
| Ex. 7 | " | 25/25/21/25/0.80/2/2 | 59.1 |
| Ex. 8 | " | 26/20/25/25/0.60/2/2 | 58.0 |
| Ex. 9 | 2-EHA/DOM/VAc/BA/bisMOEP/AA/MAA | 30/25/21/20/0.40/2/2 | 58.1 |
| Control 1 | 2-EHA/DOM/VAc/BA/AA/MAA | 30/25/21/20/2/2 | 59.25 |
| Control 2 | " | 25/25/21/25/2/2 | 58.25 |

2-EHA = 2-ethylhexyl acrylate
DOM = di(2-ethylhexyl) maleate
VAc = vinyl acetate
BA = butyl acrylate
HEITA = tris (2-hydroxyethyl)isocyanurate triacrylate
bisMOEP = bis(methacryloxyethyl)phosphate To a one liter reactor equipped with a reflux condenser, a thermocouple, a pitched turbine agitator and a nitrogen inlet tube, there was charged a solution containing 75 g of deionized water, 2.5 g of sodium vinyl sulfonate (25 percent w/w solution in water) and 0.36 g of an anionic surfactant (Polystep B-27, a sodium salt of ethoxylated nonylphenol sulfate manufactured and sold by Stepan Chemical Co.). A monomer mix consisting of 175 g of 2-ethylhexyl acrylate, 75 grams of butyl acrylate, 125 g of di-2 ethylhexyl maleate, 105 g of vinyl acetate, 5 g of acrylic acid, 5 g of methacrylic acid and 2.25 g of tris (2-hydroxy-ethyl) isoyanurate was added to 117.6 g of water containing 43.6 g of Polystep B-27 and 6.37 g of Polystep F-9 and agitated to make a pre-emulsion. The reactor charge was heated under nitrogen to 72°-75° C., to which was added 20.93 g of a 4.46 w/w potassium persulfate solution in deionized water. After a few minutes 66 grams of the pre-emulsified monomer and 10.46 g of potassium persulfate solution were added to the reactor over 20 to 30 minutes. To the remaining pre-emulsion there was added a pre-mixed solution containing 2.4 g water, 0.9 g, Polystep B-27, 0.13 g Polystep F-9, 5 g each of methacrylic acid and acrylic acid and 0.025 gm. n-DDM. After the temperature reached a steady state, the remaining monomer pre-emulsion and a 2.07% aqueous solution of potassium persulfate buffered with sodium bicarbonate were introduced into the reactor at respective rates of 2.25 and 0.275 g/min. for a period of 270-280 minutes. The reactor temperature was maintained between 79 to 82° C. Thirty minutes after the feed, a 2.625 g 4.8% solution of potassium persulfate was added and maintained for 45 minutes. A second solution of 2.625 g was again added and maintained for 45 minutes. Once the polymerization was complete, the contents were cooled to ambient temperature neutralized with ammonia to a pH For Examples 10 to 18 the monomers of Examples 2 to 9 were polymerized except that the monomer composition included 0.025 g of n-DDM as in Example 1.

Table 2 shows the guillotine performance of the emulsion polymer of Example and some polymers from Table 1. The polymers were coated on a release liner at a coat weight of 22-24 g/sqm and then laminated to 60 pound per ream litho paper. 100 sheets measuring 2.5 mm $\times$ 200 mm were then cut using the guillotine press. As can be seen, from Table 2 most of the polymers show excellent guillotine performance. The lowest rating is very good indicative of the fact that these compositions will perform well on the guillotine press for sheeting of PSA constructions.

TABLE 2

| | Guillotine Performance | |
|---|---|---|
| Example | Rating[1] Blade | Smear[2] |
| Ex 1 | 1.5 | 1.5 |
| Ex 1, plus 0.06% Al acetate | 1-1.5 | 1-1.5 |
| Ex 2 | 2 | 2 |
| Ex 3 | 1-1.5 | 2 |
| Ex 4 | 1.5 | 1.5 |
| Ex 5 | 1.5 | 1.5 |
| Ex 6 | 1.5 | 1.5 |

[1]Ratings
1 = Excellent
2 = Very Good
3 = Good
4 = Fair
5 = Poor
6 = Very Poor
[2]Smear is the adhesive spread on the guillotined stack of labels.

Table 3 shows the adhesive performance initially and after aging at 70° C. for one week and three weeks using the same adhesive construction as was used for Table 2.

TABLE 3

| | Performance on Paper (Litho) | | | | | | | | |
|---|---|---|---|---|---|---|---|---|---|
| | Initial | | | 1 Wk @ 70° C. | | | 3 Wk @ 70° C. | | |
| Sample # | 90° Peel N/m | Loop Tack N/m | RTS Min. 500 g | 90° Peel N/m | Loop Tack N/m | RTS Min. 500 g | 90° Peel N/m | Loop Tack N/m | RTS Min. 500 g |
| Ex 1 | 488pt | 660 | 1660C | — | — | 6430C | | | |
| Ex 1 0.12%AA | 480pt | 675 | 3200ps/c | — | — | 8450ps | | | |
| Ex 2 | 354pt | 574 | 4130ps/c | 331pt | 520 | 6185C | 401pt | 575 | 8600C |
| Ex 4 | 360pt | 600 | 6924C | 370pt | 583 | 8000+ | 400pt | 570 | — |
| Ex 5 | 400pt | 590 | 2350ps/c | 383pt | 640 | — | 360pt | 615 | 3000+ |
| Ex 6 | 470pt | 710 | 6000+ | 425pt | 660 | 6000+ | 425pt | 617 | 10,000+ |

TABLE 3-continued

| | Performance on Paper (Litho) | | | | | | | | |
|---|---|---|---|---|---|---|---|---|---|
| | Initial | | | 1 Wk @ 70° C. | | | 3 Wk @ 70° C. | | |
| Sample # | 90° Peel N/m | Loop Tack N/m | RTS Min. 500 g | 90° Peel N/m | Loop Tack N/m | RTS Min. 500 g | 90° Peel N/m | Loop Tack N/m | RTS Min. 500 g |
| Ex 7 | 415pt | 700 | 1600C | 420pt | 570 | 2300C | | | |
| Ex 8 | 480pt | 700 | 1386ps | 440pt | 627 | 2400ps | 420pt | 655 | — |
| Control 1 | 465pt | 730 | 6200C | 433pt | 685p | 4600ps | 438pt | 635 | — |

AA = Aluminum acetate
C = Cohesive failure
ps = Panel Stain
pt = Facestock Tear
RTS = Room Temperature Shear It is evident from Table 3 that aging improves the shear performance without sacrificing the peel and tack adhesion, a phenomenon which is unusual and unique since normally all pressure-sensitive adhesives tend to loose adhesion properties on aging at elevated temperatures, some drastically and some to a lesser extent, especially when there is a shear improvement.

Table 4 illustrates the performance using 2 mil mylar as the facestock, initially, as well as after 70° C. aging. All the samples were coated on mylar at a coat weight of 25-30 g/sqm. Again it is apparent that the adhesion properties are not affected by aging irrespective of the facestock, whereas the aceto-acetoxy ethyl methacrylate (AAEMA) containing polymers do show some adhesion loss on aging (Table 8 in U.S. application Ser. No. 393,970).

TABLE 4

| | Performance Using Polyester (mylar) as facestock | | | | | |
|---|---|---|---|---|---|---|
| | 180° Peel N/m | | Loop Tack N/m | | RTS 500 g | 70° C. Shear 1 Kg. |
| Sample # | 20 min. | 1 wk. @ 70° C. | 20 min. | 1 wk. @ 70° C. | ½ × ½" min. | 1 × 1" min. |
| Ex 1 | 395 | 355 | 370 | 395 | 3000+ | — |
| Ex 1 0.12AA | 320 | 390 | 420 | 435 | 10000+ | 10000+ |
| Ex 3 | 450 | 445 | 590 | 500 | 3225C | — |
| Ex 3 0.12AA | 390 | 445 | 520 | 550 | 10000+ | — |
| Ex 6 | 345 | 420 | 445 | 510 | — | — |
| Control 1 | 385 | 430 | 355 | 375 | 2350C | — |

The polymers of the present invention also exhibit very high elevated temperature shear exceeding 10000+ minutes showing its utility in high performance tapes such as automotive tapes. The elevated temperature shear was measured at 70° C. using 1"×1" sample, with 24 hour dwell time, using a 1 Kg load.

The adhesives of the present invention also show very good mandrel performance to make them suitable for pharmaceutical applications where solvent adhesives are currently being used. Examples 1, 3,4 and 6 were tested for mandrel on 0.25 inch diameter glass tube and 0.5 inch diameter polyethylene rod. All the samples gave a rating of 3.5-4 indicative of very minimal lift (<1/16 inch) and the suitable applicability of the polymer on curved substrates.

What is claimed is:

1. In the formation of inherently tacky pressure-sensitive adhesive polymers by emulsion polymerization of at least one soft alkyl acrylate monomer having a glass transition temperature less than about −25° C. and at least one hard monomer having a glass transition temperature greater than 0° C., the improvement which comprises forming the polymer in the presence of at least one reactive multifunctional monomer having at least two acrylate or methacrylate groups and a cyanurate or phosphate functionality, said multifunctional monomers being present in an amount of from 0.1 to about 1 percent by weight of the monomers.

2. An inherently tacky, pressure-sensitive adhesive polymer formed by emulsion polymerization, which polymer comprises, on a polymerized basis:
   (a) at least one alkyl acrylate containing from about 4 to about 12 carbon atoms in the alkyl group, the total amount of alkyl acrylate present in an amount of from about 35 to about 95 percent by weight of the monomers;
   (b) at least one monomer selected from the group consisting of:
      (i) vinyl ester containing from 2 to about 16 carbon atoms in the alkyl group of the ester;
      (ii) diesters of a dicarboxylic acid in which each alkyl group of the diester independently contains from about 4 to about 12 carbon atoms;
      (iii) unsaturated carboxylic acids containing from about 3 to about 5 carbon atoms;
      (iv) methacrylates containing from 1 to about 8 carbon atoms in the alkyl group and,
   (c) at least one reactive multifunctional monomer having at least two acrylate or methacrylate groups and a cyanurate or phosphate functionality, said multifunctional monomer being present in an amount from 0.1 to about 1 percent by weight of the monomers.

3. A pressure-sensitive adhesive polymer as claimed in claim 1 in which the alkyl acrylate is a mixture of 2-ethylhexyl acrylate and butyl acrylate.

4. A pressure-sensitive adhesive polymer as claimed in claim 2 in which the alkyl acrylate is a mixture of 2-ethylhexyl acrylate and butyl acrylate.

5. A pressure-sensitive adhesive polymer as claimed in claim 2 in which the vinyl ester is present in a total amount of from about 20 to about 25 percent by weight based on the total weight of the monomers.

6. A pressure-sensitive adhesive polymer as claimed in claim 2 in which the diester of the dicarboxylic acid is selected from the group consisting of di-2-ethylhexyl maleate, di-2-ethylhexyl fumarate, and mixtures thereof.

7. A pressure-sensitive adhesive polymer as claimed in claim 2 in which the unsaturated carboxylic acid is present in an amount of form about 2 to about 5 percent by weight of the total monomers.

8. A pressure-sensitive adhesive polymer as claimed in claim 2 in which the unsaturated carboxylic acid is selected from the group consisting of acrylic acid, methacrylic acid, and mixtures thereof.

9. A pressure-sensitive adhesive as claimed in claim 1 in which the reactive multifunctional monomer is selected from the group consisting of tris(2-hydroxyethyl)isocyanurate triacrylate, bis(methacryloxyethyl) phosphate and mixtures thereof.

10. A pressure-sensitive adhesive as claimed in claim 2 in which the reactive multifunctional monomer is selected from the group consisting of tris(2-hydroxyethyl) isocyanurate triacrylate, bis(methacryloxyethyl) phosphate and mixtures thereof.

* * * * *